United States Patent [19]

Suzuki

[11] 4,091,770
[45] May 30, 1978

[54] ROTARY ENGINE

[75] Inventor: Satoshi Suzuki, Chiba, Japan

[73] Assignee: Suzuki Industry Co., Ltd., Chiba, Japan

[21] Appl. No.: 635,358

[22] Filed: Nov. 26, 1975

[30] Foreign Application Priority Data

Nov. 28, 1974 Japan .................................. 49-135840

[51] Int. Cl.² ............................................. F02B 53/00
[52] U.S. Cl. ..................................... 123/242; 418/112
[58] Field of Search .............. 123/8.45; 418/112, 123, 418/124

[56] References Cited

U.S. PATENT DOCUMENTS

| 1,408,292 | 2/1922 | Hart ................................. 418/112X |
| 2,270,222 | 1/1942 | Rea et al. ......................... 418/124 X |
| 3,771,501 | 11/1973 | DeDobo ........................... 418/124 X |
| 3,777,720 | 12/1973 | Williams ........................ 123/8.45 X |
| 3,853,438 | 12/1974 | Sato ................................... 418/123 X |
| 3,881,848 | 5/1975 | Huf ..................................... 418/123 |

FOREIGN PATENT DOCUMENTS

| 1,426,036 | 9/1969 | Germany ............................ 123/8.45 |
| 37,481 | 4/1967 | Japan ................................. 418/112 |
| 617,042 | 1/1949 | United Kingdom ................. 418/112 |

*Primary Examiner*—Carlton R. Croyle
*Assistant Examiner*—Michael Koczo, Jr.

[57] ABSTRACT

A rotary engine comprises a rotor housing, rotor and seal pieces at the apexes of the rotor, all of which define combustion chambers. Of these combustion chambers, one is divided at the compression cycle into two sections. A mixed gas is explosively ignited only at the combustion chamber section situated on the advancing angle side, so as to impart rotation force to the rotor.

2 Claims, 5 Drawing Figures

ROTARY ENGINE

BACKGROUND OF THE INVENTION

This invention relates to a rotary engine designed to increase the rotation force of a rotor.

A conventional rotary engine as shown in FIG. 1 comprises a rotor housing 10 having a trochoidally curved inner surface and a rotor 11 having three apexes 12 and adapted to be rotated in an eccentric fashion. A seal piece 13 is mounted on each apex of the rotor to define three combustion chambers 14, 15 and 16 between the outer wall of the rotor and the inner wall of the rotor housing 10. The rotor housing 10 includes a suction port 17 for introducing an air-fuel mixed gas into the combustion chamber 14 at the suction cycle, an ignition plug 18 for igniting the mixed gas at the compression cycle and an exhaust port 19 for sending the combustion gas to the outer atmosphere. Within the rotor is provided an internal gear (not shown) which is in mesh with an external gear (not shown) provided on an eccentric shaft 20. At the start of the rotor, the shaft 20 is rotated by a self-start motor (not shown).

In the known rotary engine, the rotation of the shaft causes its external gear to be engaged with an internal gear of the rotor to permit the rotor 11 to be rotated in an eccentric fashion. By so doing, a mixed gas is introduced through the suction port 17 into the combustion chamber 14 and the mixed gas is compressed in the combustion chamber 15 and ignited by an ignition plug 18.

In the prior art rotary engine described, the explosion force ($F = f_A + f_B$), i.e., the force generated by the expansion of the exploded gas, acts on one side of the rotor and a resultant force $P_g$ is obtained. In the drawing, the arrows $f_A$ and $f_B$ denote the directions in which portions of said one side of the rotor receive the explosion force. Since at this time the center of the rotor $t$ is displaced off the center of the shaft $s$ the resultant force is resolved into a tangent force Pt and a centripetal force Pu, i.e., a force tending to push the center of the shaft $s$. The centripetal force Pu is received on the bearing portion of the shaft and the tangent force Pt, i.e. a force tending to rotate the shaft, becomes an actual rotation force. Thus, the rotation torque of the rotary engine Md is:

$$Md = Pt \times e$$

where $e$ is an amount of eccentricity between the center of the rotor $t$, and the center of the shaft $s$.

That is, if the greater resultant force Pg is obtained, a greater tangent force Pt and greater centripetal force Pu results. Thus, a greater rotation torque Md is obtained. In order to produce a greater rotation torque Md, therefore, it is necessary to make greater the combustion chamber of the rotor and the amount of eccentric force.

At the combustion cycle, therefore, an explosion force F is applied to the corresponding outer wall of the rotor and can be resolved into an explosion force $fA$ on the advancing angle side and explosion force $fB$ on the astern side, viewed with respect to an extension line passing through the center of the rotor $t$ and the center of the shaft $s$. In this case, the explosion force $fA$ on the advancing angle side turns into an effective rotation force and the explosion force $fB$ becomes a reverse rotation force. Therefore, when the resultant point coincides with the center of the rotor 11, if the amount of eccentricity $e$ is zero, no rotation force is obtained. As the amount of eccentricity $e$ is increased, $$fA + fB = F \text{ or } Pg.$$

The resultant force Pg is resolved into a tangent force Pt and component force Pu and the rotation torque Md is:

$$Md = Pt \times e$$

That is, no rotation force results unless an amount of eccentricity is obtained. As a result, the rotation efficiency is lowered by that extent.

SUMMARY OF THE INVENTION

It is accordingly the object of this invention to provide a rotary engine free from the above-mentioned drawbacks which can attain a high rotation efficiency. According to this invention a combustion chamber at the compression cycle is divided into two sections, one at the advancing side cycle and one at the astern side and only a compressed mixed gas is exploded in the combustion chamber section at the advancing angle side.

BRIEF DESCRIPTION OF THE DRAWING

This invention will be described by way of example by reference to the accompanying drawings in which.

DETAILED DESCRIPTION OF THE PREFERRED EMBODIMENTS

Figure 1:
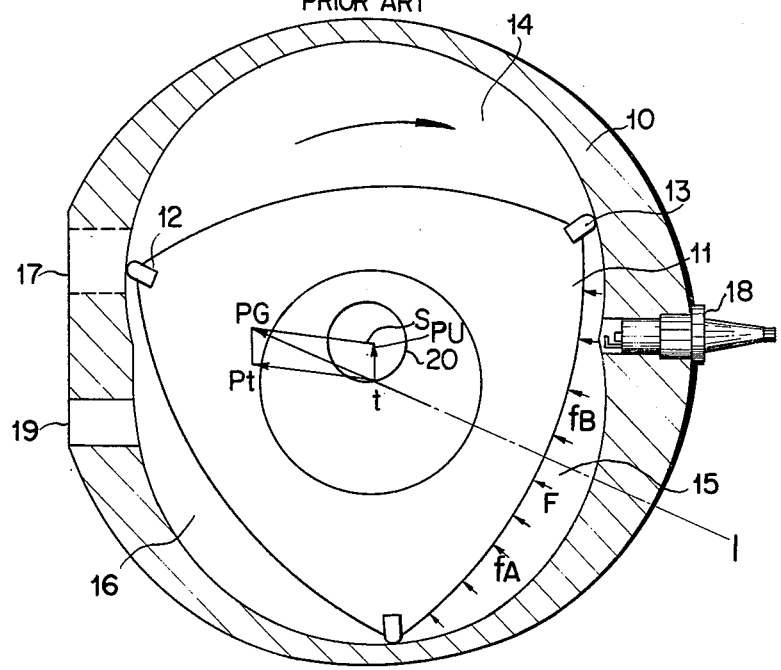
FIG. 1 is a diagrammatic, cross-sectional view of a conventional rotary engine.
Figure 2:
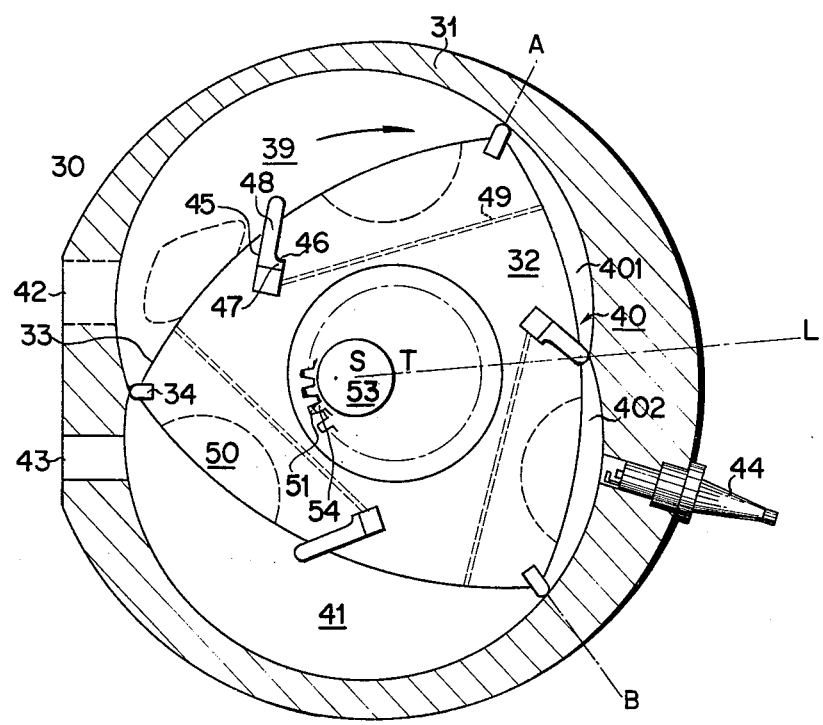
FIG. 2 is a diagrammatic, cross-sectional view of a rotary engine according to this invention.

In FIG. 2, a rotary engine according to this invention includes a rotor housing 31 having a trochoidally curved inner surface and a rotor 32 provided within the rotor housing 31 and adapted to be eccentrically rotated. The rotor 32 has a seal piece 34 at each of its three apexes 33 and three combustion chambers 39, 40 and 41 are defined by the three seal pieces 34, rotor housing 31 and rotor 32. The rotor housing 31 has a suction port 42 for introducing a fuel-air mixed gas into the combustion chamber 39 at suction cycle and an exhaust port 43 for sending an explosive gas in the combustion chamber 41 toward the outer atmosphere. In the rotor housing 31 is provided an ignition plug 44 for igniting the mixed gas in the combustion chamber 40 in the compression cycle. A mounting hole 45 is axially formed in that wall portion of the rotor which is situated substantially on a bisector between the seal pieces 34. The hole 45 is inclined at an angle of, for example 60° on the advancing angle state of the rotor, viewed with respect to a tangent line of the rotor. An engaging shoulder 46 is provided at the bottom portion of the hole 45. A seal element 48 L-shaped in cross section is slidably inserted into the hole 45 so that a stepped portion 47 of the seal element can be engaged with the shoulder 46. Each seal element is inserted axially of the rotor 32 into the hole 45 after an end plate (not shown) of the rotor is removed. Each air passage 49 is formed in the rotor wall so that it can make a communication between the hole 45 and the corresponding combustion chamber on the astern angle side. A pocket 50 of, for example, a hemispherical shape is formed in the outer wall portion of the rotor 32 which is situated between the seal element 48 and the corresponding seal piece 34 on the advancing angle side.

Inside the rotor 32 is disposed an internal gear 51 which meshes with an external gear 54 formed on an eccentric shaft 53. The shaft 53 is adapted to be started by a self-start motor.

FIG. 2 shows the state in which during the rotation of the self-start motor the external gear 54 on the shaft 53 is engaged with the internal gear 51 of the rotor 32 to cause the seal element 48 to be slidably contacted with a middle point situated between A and B of the rotor housing. In this state, a mixed gas is sucked through the suction port 42 into the combustion chamber 39 and the seal element 48 is outwardly extended under a centrifugal force and compressed gas pressure, into contact with the rotor housing 31, causing the combustion chamber 40 to be divided into two sections 401 and 402. The mixed gas in each chamber section is compressed. In other words, the two chamber sections 401 and 402 are at a compression. The compressed gas in the combustion chamber section 402 situated on the advancing angle side of the rotor is ignited by the ignition plug 44 to cause the rotor 32 to be rotated. Some of the compressed gas in the combustion chamber section 401 situated on the astern angle side of the rotor is supplied through the air passage 49 into the bottom space of the hole 45 to cause the seal element 48 to be urged in an outward direction, while the remaining compressed gas in the combustion chamber section 401 is exploded during the combustion cycle. The seal element 48, which divides the combustion chamber into two sections, is slidably engaged, at the start of the compression cycle, with a point A on the inner wall of the rotor housing and, at the end of the combustion cycle, with a point B on the inner wall of the rotor housing.

Of all the compressed gas in the combustion chamber 40, the gas in the combustion chamber section 401 is not exploded and only the gas in the combustion chamber section 402 is exploded to cause the rotor 32 to be rotated under the influence of an explosion force. That is, the point of application of the explosion force is situated on the advancing angle side when viewed with respect to an extension line passed through a center s of the shaft 53 and a center T of the rotor 32. It is needless to say that, if both the compressed gases are simultaneously exploded in the combustion chamber sections 401 and 402, a force $fA$ effective to rotate the rotor 32 is decreased and a rotation efficiency is lowered due to the attendant decrease of a rotation torque Md. Since in this way an explosion force effective only to rotate the rotor is obtained according to this invention, a rotation efficiency is elevated as compared with a known rotary engine in which the combustion chamber is not divided into two sections. In order to obtain a greater rotation force, the pocket 50 is formed in the outer wall of the rotor 32. The pocket 50 is situated on the advancing side of the rotor when viewed from each seal element 48. For this reason, the volume of the combustion chamber section 402 on the advancing angle side of the rotor is increased as compared with the conventional pocketless rotor and, in consequence, the rotation efficiency of the rotor can be enhanced. Since the seal element has an arcuate top and is urged, under the centrifugal force and exploded gas pressure, into contact with the inner wall of the rotor housing 31, it assures a positive seal with respect to the rotor housing 31. The engaging shoulder 46 of the hole 45 is adapted to be engaged with the stepped portion 47 constituting the bottom portion of the seal element. This arrangement is simple in construction and prevents the seal element 48 from being thrown away from the hole 45.

Figure 3:
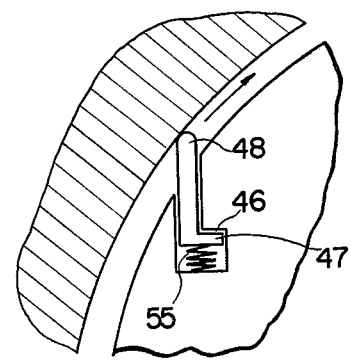
FIGS. 3 to 5 each is a partial, cross-sectional view of a rotary engine according to this invention in which a combustion chamber is divided into two sections.

FIG. 3 shows part of a rotary engine according to a second embodiment of this invention in which means is provided for dividing the combustion chamber into two sections during the compression cycle. In this embodiment, urging means such as a compression spring 55 is provided between the bottom of the hole 45 and the bottom of the element 48, without providing any air passage 49 in FIG. 2. Since the seal element 48 is normally outwardly extended, under the influence of the spring 55, from the outer wall of the rotor 32, it is positively urged, during the compression cycle, into contact with the inner wall of the rotor housing 31. It is preferred in this case that a compressed gas in the combustion chamber section 401 be effectively utilized by providing any air passage 49 as shown in the first embodiment.

Figure 4:
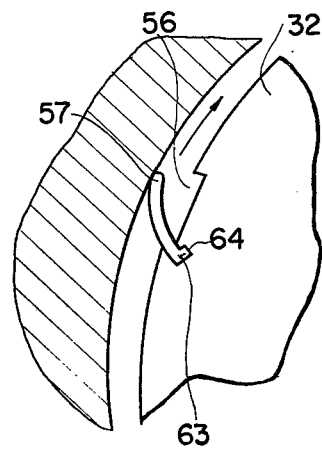

FIG. 4 shows part of a rotary engine according to a third embodiment of this invention, in which means is provided for dividing the combustion chamber 40 into two sections during the compression cycle. In this embodiment, a leaf spring 57 is fitted into each groove 56 which is provided at a predetermined place in the outer wall of the rotor i.e. substantially at a center between the seal piece 34. The leaf spring 57 normally assumes a plate-like appearance and is bent arcuately during the compression cycle. The leaf spring 57 has a stepped portion adapted to be engaged with an engaging hole which is formed at one side of the groove 56. Like the above-mentioned seal element 48, the leaf spring 57 is bent into contact with the rotor housing. It is preferred that the depth of the groove be made greater than the thickness of the leaf spring. This embodiment is simple in design as compared with the above-mentioned embodiments.

Figure 5:
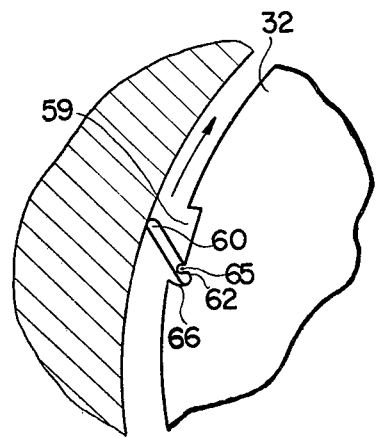

FIG. 5 shows part of a rotary engine according to a fourth embodiment of this invention in which means is provided for dividing the combustion chamber 40 into two sections. In this embodiment, each groove 59 is provided, like the third embodiment, in the outer wall of the rotor 32.

An inclining portion 62 is provided in a position short of one side of the groove 59 with a circular recess 66 left therebetween. A pin 65 is detachably mounted at each side of the inclining portion 62. When the rotor is at rest, the hinge 60 is received within the groove 59. During the rotation of the rotor, the hinge 60 is raised under a centrifugal force into contact with the inner wall of the rotor housing 31. In this case, the bottom of the hinge 60 is slidably moved along the circular recess 66. The angle of the hinge 60 with respect to a tangent line of the rotor 32 can be easily adjusted by varying the inclining angle of the inclining portion 62.

This invention should not be restricted to the above-mentioned embodiments and it can be changed in a variety of ways without departing from the spirit and scope of this invention.

What is claimed is:

1. A rotary engine comprising a rotor housing having a trochoidally curved inner wall, a fuel suction port, and an exhaust gas discharge port, and a rotor having an outer wall with three apexes and mounted for eccentrically rotating about a central shaft, said rotor including seal pieces respectively mounted to the apexes of the rotor and sliding along the inner wall of the rotor housing to define three combustion chambers, three mounting holes each having a bottom portion and being inclined in the direction of rotation of the rotor and respectively positioned at the bisector of a straight line joining two adjacent apexes of the rotor, said bisector extending through the center of the rotor and intersecting with the outer wall of the rotor, three seal elements each respectively slidably arranged in the mounting hole, having a semi-spherical top portion, and serving to divide the combustion chamber under the compression-explosion stroke into a compression section and an explosion section, gas passageways respectively connecting the bottom portion of each mounting hole with the combustion chamber located in front of the respective apex ahead of the respective mounting hole to thereby permit the respective seal element to be pushed outwardly by compressed gas in the respective combustion chamber during the compression-explosion stroke of the engine, and recesses each formed on that portion of the outer wall of the rotor at which is formed the explosion section, thereby rendering the volume of the explosion far larger than that of the compression section, said rotor housing including an ignition plug for igniting the air-fuel mixture in the explosion section of the combustion chamber.

2. The rotary engine according to claim 1, wherein each mounting hole is of a stepped structure with the cross-sectional area increasing stepwise toward the bottom portion, and the respective seal element has engaging means for engagement with the mounting hole.

* * * * *